(12) United States Patent
Kim (10) Patent No.: US 7,724,329 B2
(45) Date of Patent: *May 25, 2010

(54) TRANSFLECTIVE TYPE LIQUID CRYSTAL DISPLAY DEVICE AND A METHOD FOR FABRICATING THE SAME

(75) Inventor: Dong Guk Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 507 days.

This patent is subject to a terminal disclaimer.

(21) Appl. No.: 11/639,179

(22) Filed: Dec. 15, 2006

(65) Prior Publication Data

US 2007/0153174 A1 Jul. 5, 2007

(30) Foreign Application Priority Data

Dec. 29, 2005 (KR) ............... 10-2005-0134120

(51) Int. Cl.
*G02F 1/1335* (2006.01)
(52) U.S. Cl. ..................................... 349/114
(58) Field of Classification Search .......... 349/113–114
See application file for complete search history.

(56) References Cited

U.S. PATENT DOCUMENTS

| 7,379,135 | B2 * | 5/2008 | Lin et al. ............ 349/114 |
| 2003/0133061 | A1 | 7/2003 | Chang et al. ......... 349/113 |
| 2005/0142678 | A1 | 6/2005 | Kim .................... 438/30 |
| 2007/0153142 | A1 * | 7/2007 | Nam et al. ............ 349/38 |

* cited by examiner

*Primary Examiner*—Dung T. Nguyen
(74) *Attorney, Agent, or Firm*—Morgan, Lewis & Bockius LLP (57) ABSTRACT

A transflective type LCD device includes a substrate, gate and data lines perpendicularly arranged to each other to define unit pixel regions each including transmitting and reflective parts, a plurality of thin film transistors formed adjacent to crossing portions of the gate and data lines, a passivation layer formed on the substrate including the thin film transistors, a plurality of pixel electrodes formed on the passivation layer in each unit pixel region, a plurality of first reflective plates electrically connected with the pixel electrodes and formed in the reflective parts, and second reflective plates formed on a predetermined portions of the substrate corresponding to the boundaries between the transmitting parts and the reflective parts.

17 Claims, 7 Drawing Sheets

TRANSFLECTIVE TYPE LIQUID CRYSTAL DISPLAY DEVICE AND A METHOD FOR FABRICATING THE SAME

This application claims the benefit of the Korean Patent Application No. P2005-134120 filed on Dec. 29, 2005, which is hereby incorporated by reference.

BACKGROUND OF THE INVENTION

1. Field of the Invention

The present invention relates to a liquid crystal display (LCD) device, and more particularly, to a transflective type LCD device which can maximize the light-use efficiency in a transmitting part of a pixel region, and a method for fabricating the same.

2. Discussion of the Related Art

Among various ultra-thin flat display devices with a thickness of several centimeters, an LCD device is used for various products, including notebook computers, monitors, spacecraft, and aircraft. An LCD device includes first and second substrates, and a liquid crystal layer formed between the first and second substrates. The first substrate includes a gate line, a data line, a thin film transistor, and a pixel electrode. The second substrate includes a light-shielding layer that prevents the light from leaking, a color filter layer formed on the light-shielding layer, and a common electrode formed on the color filter layer.

The LCD device may be classified into a transmitting type, a reflective type, and a transflective type. A transmitting type LCD device uses a backlight unit as a light source. However, the transmitting type LCD device consumes a large amount of power due to the use of the backlight unit. A reflective type LCD device uses the ambient light as a light source instead of a backlight unit. However, the reflective type LCD device cannot be used in dark surroundings. On the other hand, a transflective type LCD device has properties of both the transmitting type and the reflective type LCD and overcomes problems related to the high power consumption of the transmitting type LCD device and the environmental restrictions on use of the reflective type LCD device. Accordingly, a transflective type LCD overcomes these defects of the transmitting and reflective type LCD devices by including both transmitting and reflective parts in one unit pixel.

The transflective type LCD device includes a pixel electrode and a reflective plate to improve the brightness. The pixel electrode enables the light incident on the liquid crystal layer from the backlight unit to pass through the first substrate. Also, the reflective plate reflects the ambient light incident to the second substrate from the bright surroundings.

Figure 1A:
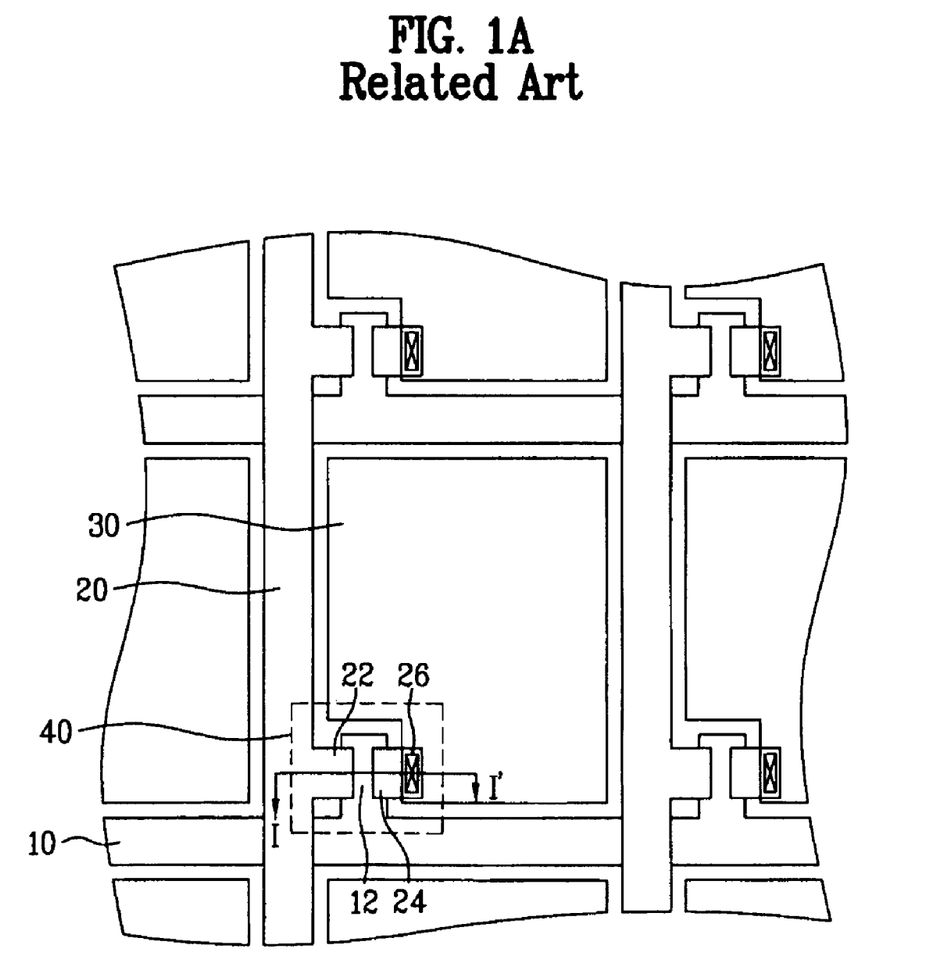
FIG. 1A is a plan view of schematically illustrating a first substrate of a related art LCD device.

Hereinafter, a related art transflective type LCD device will be explained with reference to the accompanying drawings. FIG. 1A is a plan view of a first substrate according to a related art LCD device, and FIG. 1B is a cross section view along I-I' of FIG. 1A.

Figure 1B:
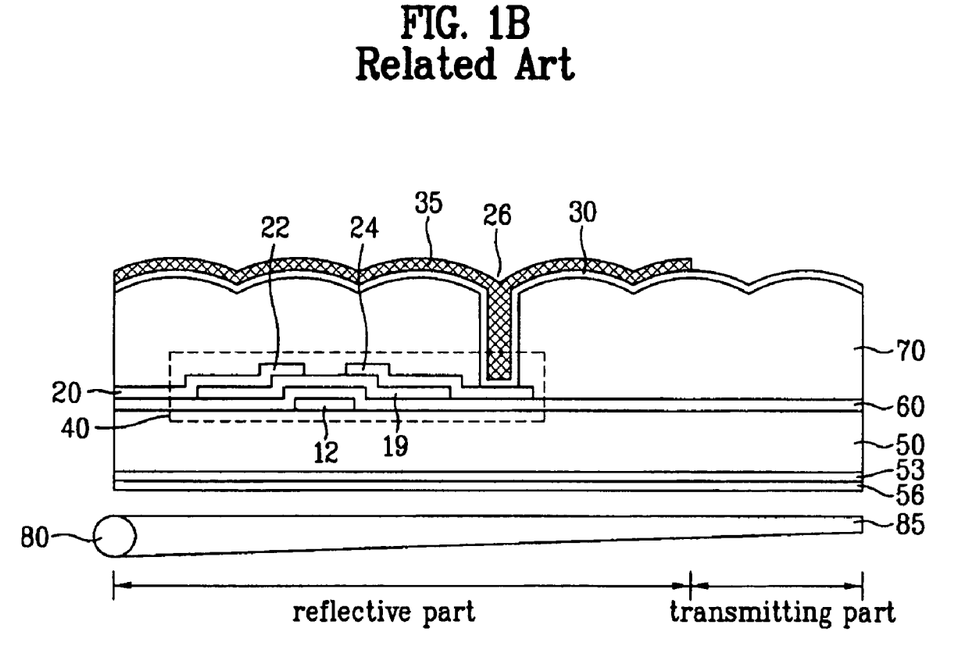
FIG. 1B is a cross sectional view along I-I' of FIG. 1A.

As shown in FIGS. 1A and 1B, a first substrate includes a gate line 10, a data line 20, and a thin film transistor 40. At this time, the gate and data lines 10 and 20 are perpendicular to each other to define a pixel region. Also, the thin film transistor 40 is formed adjacent to each crossing portion of the gate and data lines 10 and 20.

On the thin film transistor 40, there is a passivation layer 70 that includes a contact hole 26 provided in a predetermined portion corresponding to each pixel region. Through the contact hole 26, a pixel electrode 30 is connected to a drain electrode 24 of the thin film transistor 40. Then, a reflective plate 35 is formed on a predetermined portion of the pixel electrode 30. While the pixel electrode 30 is formed of a transparent conductive material, the reflective plate 35 is formed of a metal material having good reflectivity. The reflective plate 35 is formed only in a reflective part, shown in FIG. 1B.

The thin film transistor 40 includes a gate electrode 12 that is connected to the gate line 10, a gate insulating layer 60 that is formed on an entire surface of the first substrate including the gate electrode 12 and the gate line 10, a semiconductor layer 19 that is formed on the gate insulating layer 60 above the gate electrode 12, a source electrode 22 that is connected to the data line 20 being positioned above one end of the semiconductor layer 19, and a drain electrode 24 that is electrically connected with the pixel electrode 30 through the contact hole 26, being positioned above the other end of the semiconductor layer 19.

The above-mentioned transflective type LCD device includes a wavelength plate 53 and a polarizing plate 56 that control light incidence and emission. The wavelength plate 53 and the polarizing plate 56 are formed on the outer surface of each of the first substrate and the second substrate (not shown) to control the incidence and emission of the ambient light. The wavelength plate 53 corresponds to a quarter wave plate (QWP) having a phase difference of $\lambda/4$. Accordingly, the wavelength plate 53 changes the polarization state of light by either changing linearly polarized light to elliptically polarized light, or by changing elliptically polarized light to linearly polarized light. The polarizing plate 56 is adhered to the outer surface of the wavelength plate 53. The polarizing plate 56 transmits only the light that is parallel to a light-transmittance axis. Accordingly, ambient light becomes linearly polarized after passing through the polarizing plate 56.

A backlight 80 is positioned beneath the polarizing plate 56. When the light emitted from the backlight 80 is incident on the first substrate by a light-guiding plate 85, the light being incident on the reflective part is completely blocked by the wavelength plate 53 of the first substrate after being reflected on the reflective plate 35. Thus, the reflected light may not be redirected to the transmitting part.

If the area of the reflective plate in the pixel region increases, the reflective brightness can be improved in a reflective mode in which the backlight is turned OFF. However, due to the small aperture ratio of the transmitting part for transmitting the light emitted from the backlight, the transmitting brightness is degraded in the transmitting mode. On the other hand, if the area of the reflective plate in the pixel region decreases, the transmitting brightness is enhanced in the transmitting mode due to the large aperture ratio of the transmitting part for transmitting the light emitted from the backlight. However, the reflective brightness is degraded in a reflective mode in which the backlight is turned OFF.

Accordingly, there is a trade-off between the operation between the reflective mode and the transmitting mode in a transflective type LCD device.

SUMMARY OF THE INVENTION

Accordingly, the present invention is directed to an LCD device and a method for fabricating the same that substantially obviates one or more problems due to limitations and disadvantages of the related art.

An object of the present invention is to provide an LCD device and a method for fabricating the same, in which a second reflective plate is formed on the boundary between reflective and transmitting parts to reflect the light, emitted from a backlight and being incident on the reflective part, to the transmitting part, thereby maximizing the light-use efficiency in the transmitting part.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a transflective type liquid crystal display device includes a substrate, a plurality of gate and data lines perpendicularly arranged to each other to define unit pixel regions each including transmitting and reflective parts, a plurality of thin film transistors formed adjacent to crossing portions of the gate and data lines, a passivation layer formed on the thin film transistors, a plurality of pixel electrodes formed on the passivation layer in each unit pixel region, a plurality of first reflective plates electrically connected with the pixel electrodes and formed in the reflective parts, and second reflective plates formed on predetermined portions of the substrate corresponding to the boundaries between the transmitting parts and the reflective parts.

In another aspect, a method for fabricating a transflective type LCD device includes forming a plurality of gate and data lines perpendicular to each other on a substrate, to thereby define unit pixel regions each including transmitting and reflective parts, forming a plurality of thin film transistors adjacent to crossing portions of the gate and data lines, forming a passivation layer on the substrate including the thin film transistors, forming a plurality of pixel electrodes on the passivation layer in each unit pixel region, forming a plurality of first reflective plates on the pixel electrodes of the reflective parts, and forming a plurality of second reflective plates on predetermined portions of the substrate corresponding to the boundaries between the transmitting and reflective parts.

In another aspect, a method for fabricating a transflective type LCD device includes forming a plurality of gate and data lines perpendicular to each other on a substrate, to thereby define unit pixel regions each including transmitting and reflective parts, forming a plurality of thin film transistors adjacent to crossing portions of the gate and data lines, forming a passivation layer on the substrate including the thin film transistors, forming a plurality of first reflective plates on the passivation layer of the reflective parts, forming a plurality of pixel electrodes in the unit pixel regions of the substrate including the first reflective plates, and forming a plurality of second reflective plates on predetermined portions of the substrate corresponding to the boundaries between the transmitting and reflective parts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a transflective type LCD device according to the present invention and a method for manufacturing the same will be described with reference to the accompanying drawings.

Figure 2:
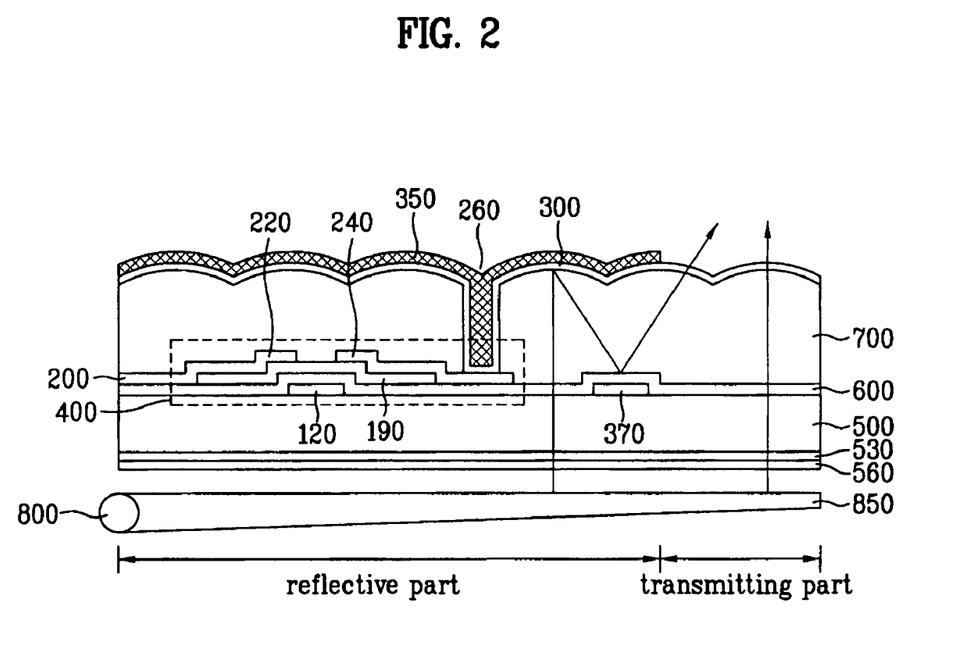
FIG. 2 is a cross sectional view of illustrating an LCD device according to a first embodiment of the present invention.

FIG. 2 is a cross sectional view of illustrating a transflective type LCD device according to a first embodiment of the present invention. The transflective type LCD device according to the first embodiment of the present invention includes a plurality of unit pixel regions. As shown in FIG. 2, each unit pixel region includes a transmitting part and a reflective part that are defined therein. Also, a thin film transistor 400 is formed on each unit pixel region of a first substrate 500. Then, a passivation layer 700 is formed on the first substrate 500 including the thin film transistor 400. A pixel electrode 300 is formed on the passivation layer 700, wherein the pixel electrode 300 is electrically connected with a drain electrode 240 of the thin film transistor 400.

At this time, the upper surface of the passivation layer 700 is embossed. Thus, the incident light is diffusedly reflected on the embossed upper surface of the passivation layer 700, thereby realizing uniform brightness. The pixel electrode 300 is formed of a transparent conductive material.

The thin film transistor 400 includes a gate electrode 120 that is connected to a gate line (not shown), a gate insulating layer 600 that is formed on an entire surface of the first substrate including the gate electrode 120, a semiconductor layer 190 that is formed on the gate insulating layer 600 above the gate electrode 120, a source electrode 220 that is connected to a data line 200 and is positioned above one end of the semiconductor layer 190, and the drain electrode 240 that is positioned above the other end of the semiconductor layer 190. At this time, the passivation layer 700 includes a contact hole positioned in a predetermined portion above the drain electrode 240, wherein the pixel electrode 300 is electrically connected with the drain electrode 240 through the contact hole.

On the pixel electrode 300, corresponding to the reflective part, there is a first reflective plate 350. The first reflective plate 350 is electrically connected with the pixel electrode 300. The first reflective plate 350 is formed of a metal material having good reflectivity, for example, aluminum (Al), aluminum neodymium (AlNd), copper (Cu), etc.

On the first substrate 500, corresponding to the boundary between the reflective part and the transmitting part, there is a second reflective plate 370. The second reflective plate 370 is formed of a metal material having good reflectivity, for example, aluminum (Al), aluminum neodymium (AlNd), copper (Cu), etc. For convenience, the second reflective plate 370 is formed on the same layer as the gate electrode 120 that is formed of the metal material having good reflectivity, for example, aluminum (Al), aluminum neodymium (AlNd), copper (Cu), etc.

The polarizing plate 560 is adhered to the lower surface of the first substrate 500. The polarizing plate 560 transmits only the light that is parallel to a light-transmittance axis. Accordingly, the ambient light becomes linearly polarized after passing through the polarizing plate 560. Also, the wavelength plate 530 is provided between the polarizing plate 560 and the lower surface of the first substrate 500. The wavelength plate 530 may be a quarter wave plate (QWP) having a phase difference of λ/4. The wavelength plate 530 changes the polarization state of light. In particular, the wavelength plate 530 changes linearly polarized light to elliptically polarized light or changes elliptically polarized light to linearly polarized light.

The second reflective plate 370 is positioned in a predetermined portion that is suitable for guiding the light being incident on the reflective part and sequentially reflected on the first and second reflective plates 350 and 370 toward the transmitting part when the light emitted from a backlight 800 is incident on the first substrate 500.

In contrast to the related art, the LCD device according to the first embodiment of the present invention can improve light-use efficiency. The reflected light blocked by the wavelength plate 530 can be reflected back into the transmitting part by the second reflective plate 370. Therefore, the light efficiency in the reflection mode and the transmission mode can both be improved at the same time without any change of the aperture ratio in the transmitting and reflective parts.

Figure 3:
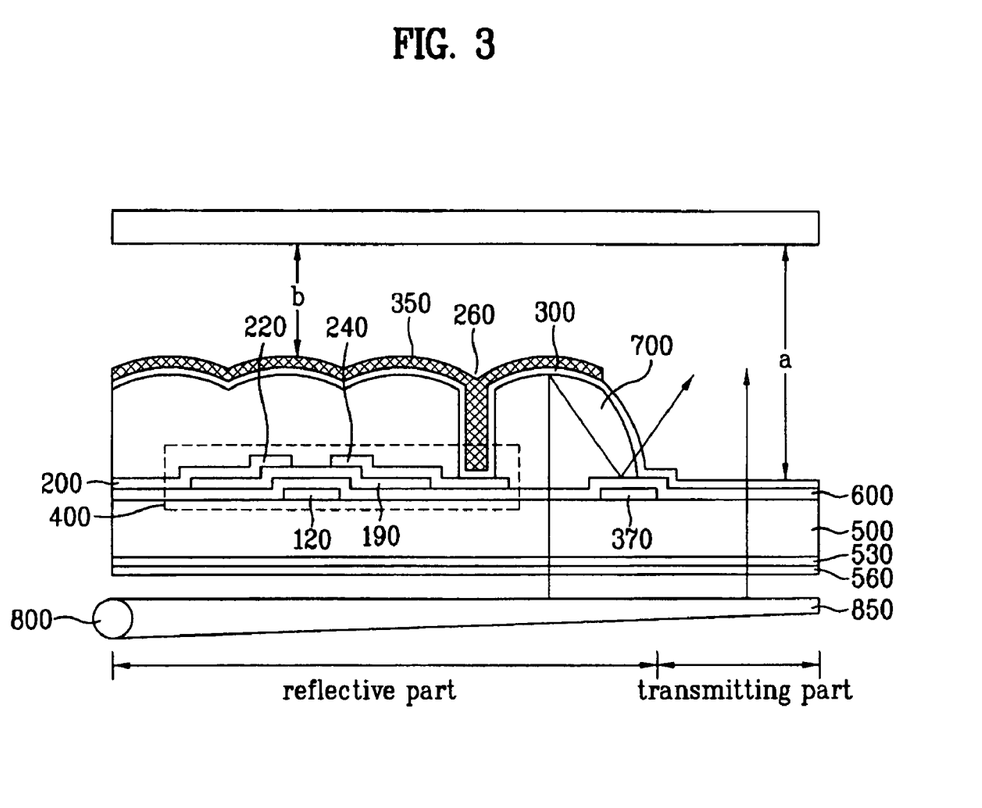
FIG. 3 is a cross sectional view of illustrating an LCD device according to a second embodiment of the present invention.

FIG. 3 is a cross sectional view of a transflective type LCD device according to a second embodiment of the present invention. Except for a passivation layer 700, other components provided in the transflective type LCD device according to the second embodiment of the present invention are identical to those of the first embodiment of the present invention, as shown in FIG. 3.

In the transflective type LCD device according to the second embodiment of the present invention, the passivation layer 700 is formed only in a reflective part. The transflective type LCD device uses both the ambient light and the light emitted from a backlight 800. When the ambient light is incident on the reflective part, and is reflected in the reflective part, the light passes through a liquid crystal layer two times. Accordingly, the traveling distance of light increases. To maximize the light-use efficiency in the transmitting and reflective parts, a step difference is formed between the transmitting part and the reflective part so as to decrease the traveling distance of light being incident on the reflective part from the outside. The step difference is formed by creating a passivation layer 700 only in the reflective part. Preferably, the cell gap b for the reflective part is one-half of the cell gap a for the transmitting part.

Figure 4:
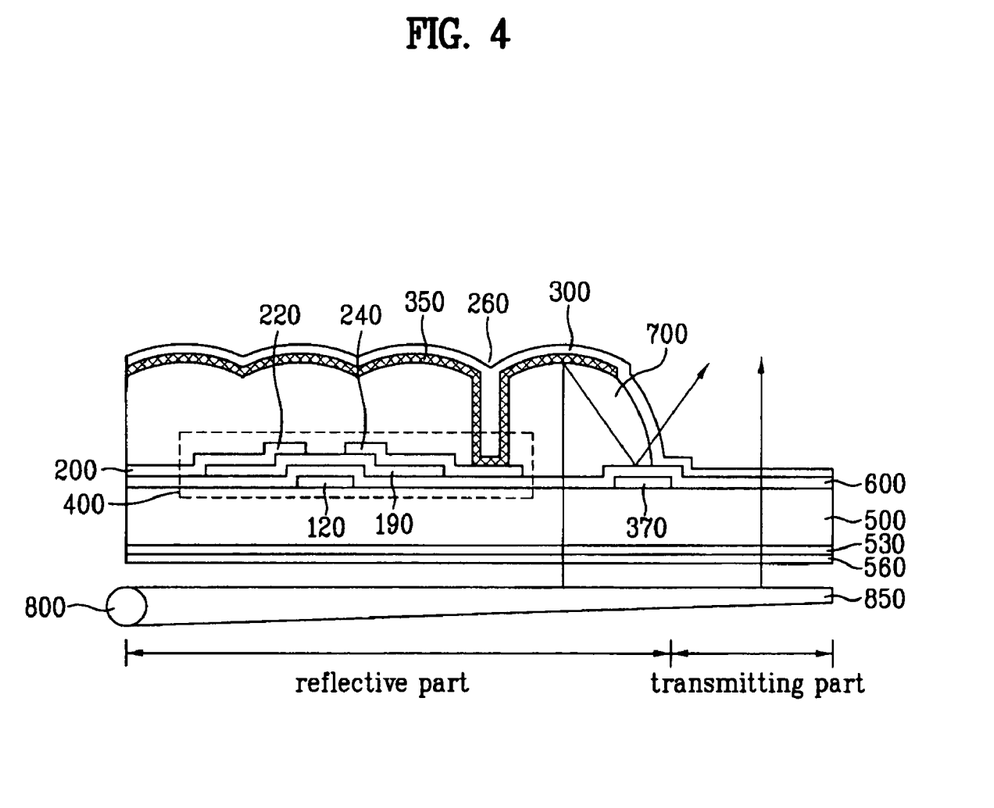
FIG. 4 is a cross sectional view of illustrating an LCD device according to a third embodiment of the present invention.

FIG. 4 is a cross sectional view of illustrating a transflective type LCD device according to a third embodiment of the present invention. As shown in FIG. 4, components provided in the transflective type LCD device according to the third embodiment of the present invention are similar to those of the second embodiment of the present invention.

In the transflective type LCD device according to the third embodiment of the present invention, a passivation layer 700 is formed only in a reflective part to maximize light-use efficiency in the reflective and transmitting parts, based on the same method according to the second embodiment of the present invention.

In the transflective type LCD device according to the second embodiment of the present invention, the pixel electrode 300 is formed on the passivation layer, and the first reflective plate 350 is formed on the pixel electrode 300. However, in the transflective type LCD device according to the third embodiment of the present invention, a first reflective plate 350 is formed on the passivation layer 700, and a pixel electrode 300 is formed on the first reflective plate 350.

In the transflective type LCD device according to the third embodiment of the present invention, the passivation layer 700 is formed only in the reflective part, and a contact hole is formed in a predetermined portion of the passivation layer 700 above a drain electrode 240 of a thin film transistor 400. Then, the first reflective plate 350 is formed in the reflective part, wherein the first reflective plate 350 is electrically connected with the drain electrode 240 through the contact hole. Also, the pixel electrode 300 is formed in the unit pixel region including the reflective and transmitting parts, wherein the pixel electrode 300 is electrically connected with the first reflective plate 350.

The pixel electrode 300 is formed of a transparent conductive material. Accordingly, the transflective type LCD device according to the third embodiment of the present invention can realize a high light-use efficiency independent of the position of the pixel electrode 300 and the first reflective plate 350.

A method for fabricating the transflective type LCD device according to the first, second, and third embodiments of the present invention will be explained as follows. As mentioned above, the first, second, and third embodiments of the present invention are similar in structure. Herein, a method for fabricating the transflective type LCD device according to the second embodiment of the present invention will be explained as follows.

FIGS. 5A to 5D are cross sectional views of the steps for fabricating the LCD device according to the preferred embodiments of the present invention.

Figure 5A:
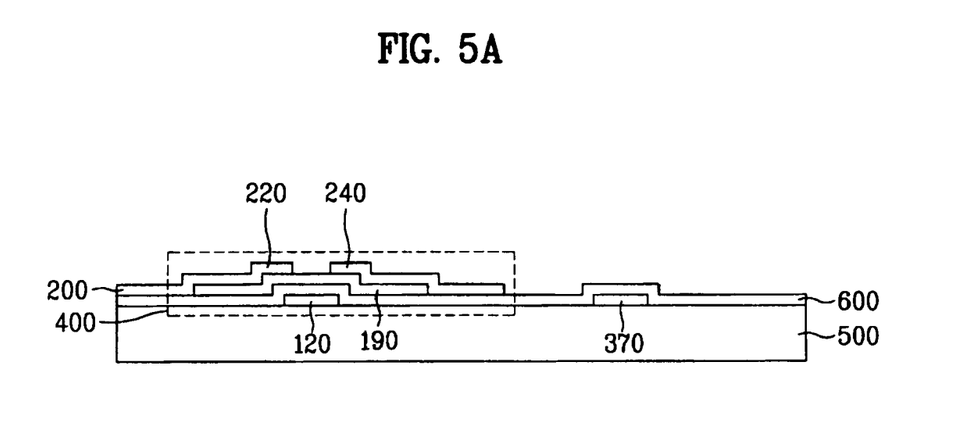
FIGS. 5A and 5D are cross sectional views of illustrating steps for fabricating an LCD device according to the preferred embodiments of the present invention.

First, as shown in FIG. 5A, the gate line (not shown) and the data line 200 are formed on the first substrate 500, and the thin film transistor 400 is formed adjacent to the crossing portion of the gate and data lines. The gate and data lines are perpendicular to each other, thereby defining the unit pixel region. Each unit pixel region includes the transmitting part and the reflective part.

The thin film transistor 400 includes the gate electrode 120 that is connected to the gate line (not shown), the gate insulating layer 190 that is formed on the first substrate including the gate electrode 120, the semiconductor layer 190 that is formed on the gate insulating layer 600 above the gate electrode 120, the source electrode 220 that is formed on one end of the semiconductor layer 190 and is connected to the data line 200, and the drain electrode 240 that is formed on the other end of the semiconductor layer 190.

The second reflective plate 370 is formed in the same step for forming the gate electrode 120. In other words, the second reflective plate 370 and the gate electrode 120 are formed at the same time. For example, a metal material is first deposited to form the gate electrode 120 and the second reflective plate 370, and is then patterned by photolithography. When patterning the metal material by photolithography, the metal material for the second reflective plate 370 is also patterned, thereby forming the second reflective plate 370 as well as the gate electrode 120.

Preferably, the second reflective plate 370 is formed of the material having good reflectivity. For example, the gate electrode 120 and the second reflective plate 370 are formed of aluminum (Al) or aluminum neodymium (AlNd). Accordingly, there is no requirement for an additional process of forming the second reflective plate 370 since the second reflective plate 370 and the gate electrode 120 are formed at the same time.

Figure 5B:
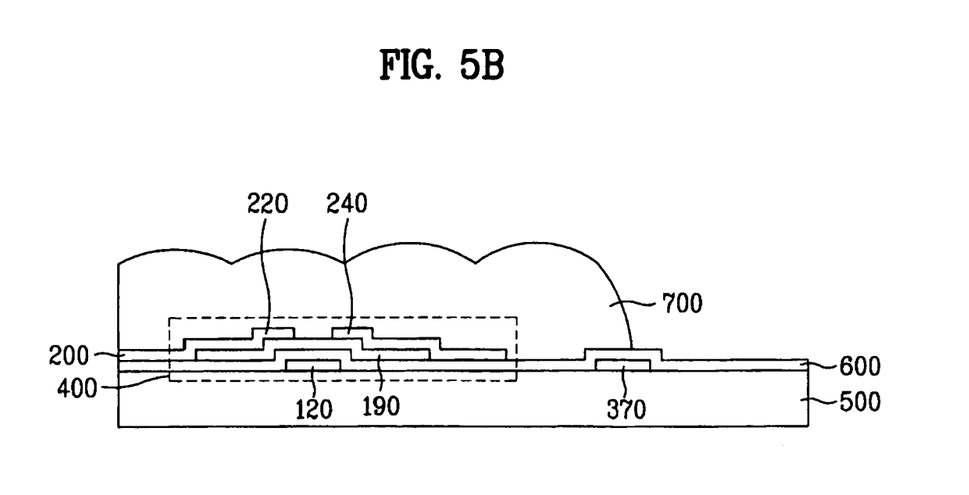

As shown in FIG. 5B, the passivation layer 700 is an organic insulation material and is formed on the thin film transistor 400. The upper surface of the passivation layer 700 is embossed so that the ambient light is diffusedly reflected from the first reflective plate. In the transflective type LCD device according to the first embodiment of the present invention, as explained above, the passivation layer 700 is formed on the entire surface of the substrate. In case of the transflective type LCD device according to the second embodiment of the present invention, as shown in FIG. 5B, the passivation layer 700 is selectively removed from the transmitting part.

Figure 5C:
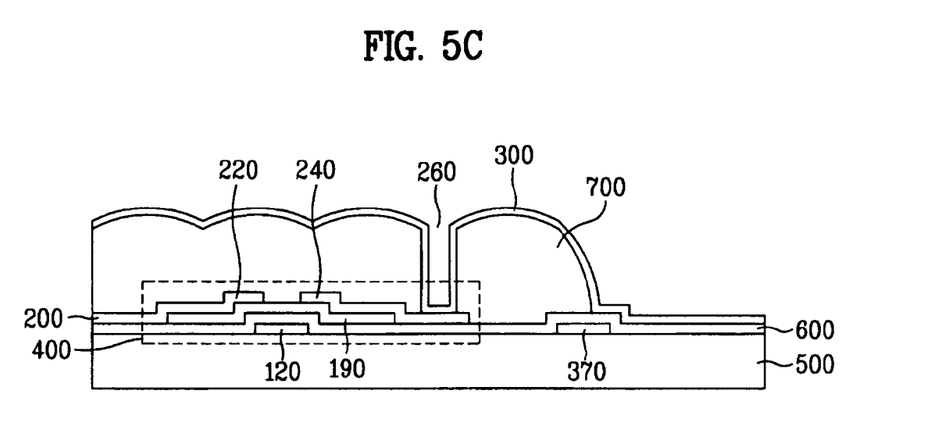

As shown in FIG. 5C, the contact hole 260 is also formed in the passivation layer 700 so as to expose the drain electrode 240. The pixel electrode 300 is formed on the passivation layer 700, wherein the pixel electrode 300 is electrically connected with the drain electrode 240 through the contact hole 260.

Figure 5D:
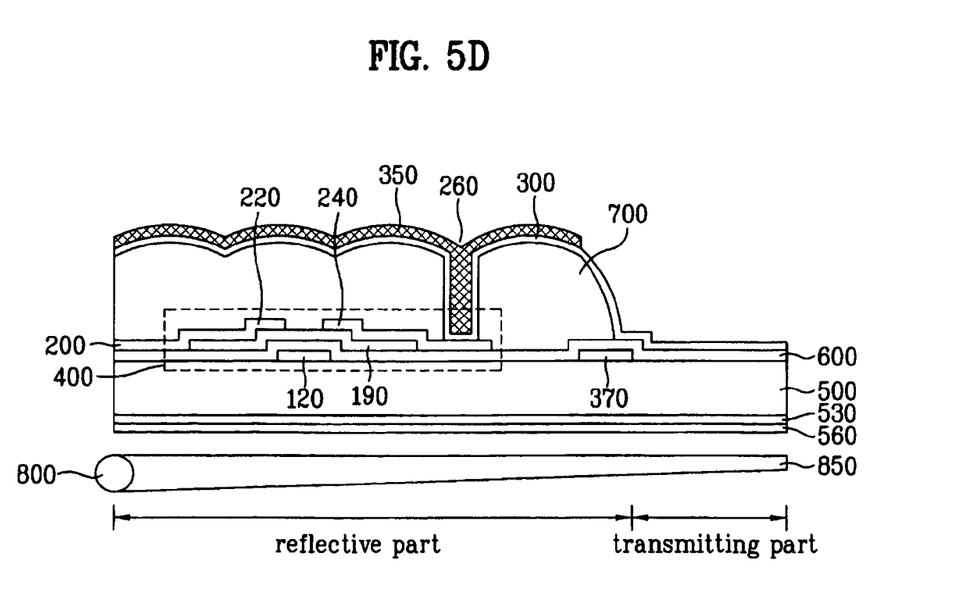

As shown in FIG. 5D, the first reflective plate 350, corresponding to the reflective part, is formed on the pixel electrode 300, wherein the first reflective plate 350 is electrically connected with the pixel electrode 300. Like the gate electrode 120 and the second reflective plate 370, the first reflective plate 350 is formed of a metal having good reflectivity, for example, aluminum (Al) or aluminum neodymium (AlNd).

Thereafter, the wavelength plate 530 and the polarizing plate 560 are adhered to the lower surface of the first substrate. Then, the first substrate including the wavelength plate 530 and the polarizing plate 560 is provided on the backlight unit including the backlight 800 and the light-guiding plate 850, thereby completing the LCD device according to the preferred embodiment of the present invention.

In FIGS. 5C and 5D, the transflective type LCD device according to the third embodiment of the present invention is fabricated by forming the pixel electrode 300 after the first reflective plate 350.

As mentioned above, the transflective type LCD device according to the present invention has the following advantages. In the transflective type LCD device according to the present invention, the second reflective plate is formed on the boundary between the transmitting part and the reflective part. Thus, the light emitted from the backlight and being incident on the reflective part is reflected from the first reflective plate to the second reflective plate, and is then reflected from the second reflective plate into the transmitting part, thereby maximizing the light-use efficiency of the transmitting part without the loss of light due to a high aperture ratio in the reflective part. As a result, it is possible to fabricate the LCD device that realizes the high brightness with the small power consumption.

It will be apparent to those skilled in the art that various modifications and variations can be made in the apparatus and method for driving liquid crystal display device of the present invention without departing from the spirit or scope of the invention. Thus, it is intended that the present invention cover the modifications and variations of this invention provided they come within the scope of the appended claims and their equivalents.

What is claimed is:
1. A transflective type LCD device comprising:
a substrate;
gate and data lines perpendicularly arranged to each other on the substrate to define unit pixel regions each including transmitting and reflective parts;
a plurality of thin film transistors formed adjacent to crossing portions of the gate and data lines;
a passivation layer formed on the substrate including the thin film transistors;
a plurality of pixel electrodes formed on the passivation layer in each unit pixel region;
a plurality of first reflective plates electrically connected with the pixel electrodes and formed in the reflective parts; and
a plurality of second reflective plates formed on a predetermined portions of the substrate corresponding to the boundaries between the transmitting parts and the reflective parts.

2. The transflective type LCD device of claim 1, wherein the first reflective plates are formed above the pixel electrodes.

3. The transflective type LCD device of claim 2, wherein each pixel electrode is electrically connected with a drain electrode of the thin film transistor.

4. The transflective type LCD device of claim 1, wherein the first reflective plates are formed beneath the pixel electrodes.

5. The transflective type LCD device of claim 4, wherein each first reflective plate is electrically connected with a drain electrode of the thin film transistor.

6. The transflective type LCD device of claim 1, wherein the second reflective plates are formed on the same layer as gate electrodes of the thin film transistors.

7. The transflective type LCD device of claim 1, wherein the passivation layer is formed only in the reflective parts.

8. The transflective type LCD device of claim 1, wherein the passivation layer is formed of an organic insulation material.

9. The transflective type LCD device of claim 1, wherein the first and second reflective plates are formed of aluminum (Al), aluminum neodymium (AlNd), or copper (Cu).

10. The transflective type LCD device of claim 1, further comprising a polarizing plate adhered to the rear surface of the substrate.

11. The transflective type LCD device of claim 1, further comprising a wavelength plate inserted and adhered between a polarizing plate and the rear surface of the substrate.

12. A method for fabricating a transflective type LCD device, comprising:
forming gate and data lines perpendicular to each other on a substrate to define unit pixel regions each including transmitting and reflective parts;
forming a plurality of thin film transistors adjacent to crossing portions of the gate and data lines;
forming a passivation layer on the substrate including the thin film transistors;
forming a plurality of pixel electrodes on the passivation layer in each unit pixel region;
forming a plurality of first reflective plates on the pixel electrodes of the reflective parts; and
forming a plurality of second reflective plates on predetermined portions of the substrate corresponding to the boundaries between the transmitting and reflective parts.

13. The method of claim 12, further comprising selectively removing the passivation layer from the transmitting parts.

14. The method of claim 12, wherein the second reflective plates are formed on the same layer as gate electrodes of the thin film transistors.

15. A method for fabricating a transflective type LCD device, comprising:

forming gate and data lines perpendicular to each other on a substrate, to thereby define unit pixel regions each including transmitting and reflective parts;

forming a plurality of thin film transistors adjacent to crossing portions of the gate and data lines;

forming a passivation layer on the substrate including the thin film transistors;

forming a plurality of first reflective plates on the passivation layer of the reflective parts;

forming a plurality of pixel electrodes in the unit pixel regions to electrically connect with the first reflective plates; and forming a plurality of second reflective plates on predetermined portions of the substrate corresponding to the boundaries between the transmitting and reflective parts.

16. The method of claim 15, further comprising selectively removing the passivation layers from the transmitting parts.

17. The method of claim 15, wherein the second reflective plates are formed on the same layer as gate electrodes of the thin film transistors.

* * * * *